United States Patent
Dieckmann et al.

(10) Patent No.: US 6,619,350 B1
(45) Date of Patent: Sep. 16, 2003

(54) VEHICLE WHEEL WITH AN EMERGENCY RUNNING SUPPORT BODY AND AT LEAST ONE LUBRICANT CONTAINER

(75) Inventors: Andreas Dieckmann, Hannover (DE); Hans-Bernd Hellweg, Seelze (DE); Michael Glinz, Neustadt (DE); Roland Jenke, Hademstorf (DE); Joachim Busche, Hannover (DE); Udo Frerichs, Langenhagen (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/714,192

(22) Filed: Nov. 17, 2000

(30) Foreign Application Priority Data

Nov. 20, 1999 (DE) .......................... 199 55 832

(51) Int. Cl.⁷ .................. B60C 17/04; B60C 17/06; B60C 17/10
(52) U.S. Cl. .................. 152/156; 29/894.31; 152/158; 152/520; 152/521; 156/110.1
(58) Field of Search ................. 152/156, 158, 152/521, 520; 156/110.1; 29/894.31

(56) References Cited

U.S. PATENT DOCUMENTS 3,990,492 A * 11/1976 Hyndman et al. .......... 152/158
4,054,168 A * 10/1977 Beers et al. ............ 152/521 X
4,091,854 A *  5/1978 French et al. .......... 152/521 X

FOREIGN PATENT DOCUMENTS

| AT | 319775 | 1/1975 | |
| DE | 4032644 | 5/1991 | |
| DE | 4032645 | 5/1991 | |
| EP | 0 860 304 A2 * | 8/1998 | .......... 152/158 |
| FR | 2095392 | 2/1972 | |

* cited by examiner

Primary Examiner—Adrienne C. Johnstone
(74) Attorney, Agent, or Firm—Greenblum & Bernstein, P.L.C.

(57) ABSTRACT

Vehicle wheel includes a rim and a pneumatic tire which includes a tread, two side walls, a carcass, reinforcing elements, and two tire beads with bead cores. An emergency running support body is supported on the rim which is arranged to support one of the pneumatic tire and an interior of the tread in an event of an emergency condition. The emergency running support body includes a shell-shaped ring body located inside the pneumatic tire and an emergency running surface on its exterior. At least one container, which contains a lubricant, is positioned inside a first ring chamber. This Abstract is not intended to define the invention disclosed in the specification, nor intended to limit the scope of the invention in any way.

5 Claims, 4 Drawing Sheets

VEHICLE WHEEL WITH AN EMERGENCY RUNNING SUPPORT BODY AND AT LEAST ONE LUBRICANT CONTAINER

BACKGROUND OF THE INVENTION

1. Field of the Invention

The present invention relates to a vehicle wheel with an emergency running support body for a pneumatic tire attached to the wheel rim that includes a tread, two sidewalls, a carcass, reinforcing elements, and two tire beads provided with bead cores. The emergency running support body is formed as a shell-shaped annular body inside the pneumatic tire, which, on its outside, has an emergency running support surface that supports the tire and the inner side of the tread in an emergency running state and that is supported on the wheel rim by one or more brackets located inside the pneumatic tire and filled with lubricant. The brackets have devices for emitting the lubricant in case of emergency running conditions.

2. Discussion of Background Information

In the critical case of a sudden loss of pressure in a tire, vehicle wheels with emergency running support bodies receive a stable driving state and an emergency running ability for a certain distance or time. Furthermore, such vehicle wheels have the advantage that, in the context of the continually reducing weights of the vehicles for the purpose of energy conservation, carrying spare wheels and/or the necessary tools for the mounting thereof can be omitted.

Emergency running or emergency running conditions is understood to mean the driving state in which, due to a sudden loss of pressure in a tire, e.g., due to outer damage, the guidance, traction, and stabilization characteristics of the tire as a link between the vehicle and the driving surface that are normally present are no longer present in their original amounts, but in which a runability and usability remain to the extent that the safety of a vehicle is not unreliably limited. The emergency running state allows the driving to continue for a certain distance, at least to the nearest repair shop.

In the emergency running state of such a vehicle tire with an emergency running support, in which the tire and/or the inner side of the tread is in contact with the emergency running surface, a slip, i.e., a relative movement and therefore friction between the emergency running surface and the inner side of the tread region, occurs due to the rolling radius of the shell-shaped ring body on the inside of the tire tread having the emergency running surface and due to the rolling radius on the street which is increased by the thickness of the tread region of the tire resting thereon.

In order to prevent the large increase in heat that arises under emergency running conditions, which can cause premature thermal destruction of the tire, it is known to provide a lubricant in the inner chamber of the tire which, for example, is applied on the inner chamber of the tire or on the emergency running surface.

Such lubricants are normally applied on the inner sides of the tire or other corresponding surfaces in the inner chamber of the tire before mounting the tire and such lubricants are essentially embodied as, e.g., Bingham fluid. As a rule, the lubricants include of a greasing agent and a structure former, e.g., lithium salt. The structure former functions to keep the actual greasing agent, e.g., polyglycol, in position and in readiness during the normal driving state. Only when the sheer stress within this structure former becomes sufficiently large due to parts of the tire and/or wheel rubbing against one another, the material begins to flow and the parts moving relative to one another are lubricated.

While such lubricants or greasing agents can optimally be applied with regard to the points of contact within the tire that arise in the emergency running state, they have an increased water contamination potential and are also a potential health hazard in processing, i.e., in their application. Moreover, there is the disadvantage that even when no emergency running state has occurred during the period of use of the tire, the lubricant cannot be reused and that, in changing from summer tires to winter tires, problems can again occur in processing and disposal.

In particular at high speeds, a manual and therefore uneven application of the lubricant can cause unevenly distributed masses in the tire and thus imbalances during operation.

One alternative to such an embodiment lies in enclosing the lubricant in a separate container that opens in the case of an emergency running state and releases the lubricant into the inner chamber of the tire. For this purpose, FR 2 095 392 discloses small containers filled with a greasing agent, see, e.g., FIGS. 5 and 7, which are arranged on and/or inside the rim and are destroyed and/or opened by the friction between the tire and the rim in the emergency running condition. However, problems arise either in the mounting of the tire, due to the additional installation of the containers and their holders with regard to handling, or in view of the impermeability to be achieved in the pressurized inner chamber of the tire when the containers are arranged in the open inner rim space and their openings are connected to the inner chamber of the tire.

DE 40 32 645 A1 discloses arranging containers filled with greasing agent in the inner chamber of a tire inside a specially embodied rim that provides emergency running surfaces on its circumference on both sides of the container. Here as well, the container is opened by contact of the inner side of the tire tread surface with a pressure switch protruding into the inner chamber of the tire. Disadvantageously, special covers and additional elements are necessary for the purpose of holding and positioning the containers in this system as well, which increases mounting expense and makes the tire as a whole heavier. Furthermore, such an arrangement of greasing agent containers cannot be used in the case of standard rims either.

The additional holders that are needed in all systems are additionally placed under the influence of strong centrifugal forces at high speeds such that highly stable constructions are necessary, which causes the expense for the entire construction to increase as well as the energy requirements for the larger masses to be moved.

Due to the problems described, the systems that have been known up to now have been unable to become an industry standard.

SUMMARY OF THE INVENTION

The present invention provides a vehicle wheel with an emergency running support body in which a lubricant is supplied exclusively in the case of emergency running conditions being initiated, and the total system is reusable independently of tire changes and is useable for standard rims as well. Moreover, no complicated construction is necessary with regard to the influence of centrifugal force, and only a small mounting expense is to be taken into account.

The present invention is similar in general to the vehicle wheel discussed above, and also includes having one or several containers positioned inside the pneumatic tire which are filled with lubricant. The containers have devices for distributing the lubricant in the case of an emergency which are positioned inside a ring chamber formed between the emergency running support body and the rim. The devices for distribution of the lubricant are connected to the ring chamber formed between the emergency running support body and the pneumatic tire.

The containers are arranged inside a ring chamber between the emergency running body and the rim, and the devices for distributing the lubricant are connected to the ring chamber formed between the emergency running body and the pneumatic tire. Such a construction makes the expense for attaching the containers conceivably low, with the container itself being located in a ring chamber that lies outside of the regions that come into contact with the inner side of the tire under emergency running conditions. Additionally, the mounting expense is negligibly low because the emergency running support body can already be provided with the containers when the total mounting, and therefore the mounting of the tire as well, occurs.

A particularly advantageous embodiment lies in the fact that the containers are arranged on the inner side of the emergency running support body and each has at least one extension extending through corresponding recesses of the ring body into the space formed by the emergency running support body and the pneumatic tire and ending essentially in the plane of the emergency running surface of the emergency running support body and on whose end the devices for distributing the lubricant are arranged.

By this embodiment, the containers themselves are supported against the shell-shaped ring body by centrifugal forces, such that additional securing is not necessary and, optionally, clamping or adhesion of the container in the region of the inner surface of the emergency running support body can be sufficient. Furthermore, the opening mechanism, namely the devices for distributing the lubricant, is to be prepared with the lowest expense because, in the case of the shells, which are thin and usually load-bearing because of their stable shape, the extensions need only be very short in order to reach through the recesses of the emergency running support body into the plane of the emergency running surface. In the case of a corresponding embodiment of the recesses and the extensions, e.g., in that the extensions are slightly oversized in comparison to the recesses, the securing of the container can also be achieved in the simplest manner via the clamping effect of the extensions inside the recesses.

A further advantageous embodiment lies in the fact that the extensions have predetermined break points in their end regions, which are arranged essentially in the plane of the emergency running surface of the ring body, in particular regions with thinner outer walls or notches. The position "essentially" in the plane of the emergency running surface naturally includes a slight protrusion of at least parts of the end regions of the extensions past the plane of the emergency running surface such that, under emergency running conditions, these end regions come into contact with the inner sides of the tire, which are then resting and/or rubbing against the emergency running surface, so as to cause the predetermined break points to be destroyed. Then, the centrifugal force acting on the lubricant causes the lubricant to enter the ring chamber formed between the emergency running support body and the pneumatic tire.

The lubricant is naturally adjusted in its theological characteristics such that its emission due to the centrifugal forces acting on it is possible without any problems.

Similar advantages are provided by embodiments in which the devices for distributing the lubricant are formed as seals arranged at the end of the extensions and essentially in the plane of the emergency running surface of the emergency running support body, in particular covers or caps, that can be torn off.

Another advantageous embodiment lies in the extensions including, e.g., in their end regions, which are arranged essentially in the plane of the emergency running surface of the emergency running support body, a material that is sensitive to mechanical or thermal stress, e.g., thermoplastic plastic.

The embodiment of such a material, which melts and/or is pulverized by the heat that arises between the emergency running surface and the inner side of the tread region, allows the extensions to be opened in a particularly simple manner, whereupon an additional shaping by notching or capping can be omitted.

Another advantageous embodiment lies in that the devices for distributing the lubricant can be activated, e.g., by pressure valves or pressure-sensitive devices. With regard to pressure-sensitive devices, this can occur, e.g., in that the end regions of the extensions include a membrane which is slightly arched inwardly, i.e., in the direction of the inner chamber of the container or the inner chamber of the extensions at full tire pressure, by which local pressures occurring during the normal state, e.g., driving over the edge of a curb, and the possible friction of the inner side of the tire against the emergency running surface without contact do not cause the container and/or the ends of the extensions to open. Only in the case of a loss of air, i.e., under emergency running conditions, do the membranes arch slightly outwardly and, thus, protrude somewhat past the emergency running surface, by which, particularly in the case of the membranes being constructed from the above-mentioned thermoplastic plastic, the thermal and mechanical strain causes the membranes to melt and the lubricant to escape.

The form of the containers filled with lubricant is advantageously adapted to the inner contour of the shell-shaped ring body. Thus, the above-mentioned problem-free support against centrifugal force is improved and the containers can be attached to or even integrated in the emergency running support body in such a way that the constructed height of the containers is minimized without needing to take into account reductions in volume.

In the case of emergency running support bodies that have instabilities caused by construction around their circumference, e.g., in the case of ones that are embodied as a slitted ring with a lock and, after being applied to the rim, must be connected to its ends, an advantageous embodiment lies in one or more containers being arranged around the circumference of the vehicle wheel and/or around the circumference of the shell-shaped ring body in such a way that such anomalies in the rotational masses of the vehicle wheel are evened out when the vehicle wheel is rotating with filled containers. Thus, a relative freedom in construction of the emergency running support body in view of uneven distribution of mass is achieved and it is possible to achieve a compensation in the simplest manner by placing the masses of the filled containers accordingly. Another advantage that results in this case is that, under emergency running conditions, in which the containers are emptied, a slight imbalance and/or an unevenness in mass that can be measured from outside occurs that informs the driver of emergency running conditions arising, either directly or as a processed signal.

The invention is directed to a vehicle wheel that includes a rim and a pneumatic tire comprising a tread, two side walls, a carcass, reinforcing elements, and two tire beads with bead cores. The pneumatic tire is mounted on the rim. An emergency running support body is supported on the rim which is arranged to support one of the pneumatic tire and an interior of the tread in an event of an emergency condition. The emergency running support body includes a shell-shaped ring body located inside the pneumatic tire and an emergency running surface on its exterior. The emergency running support body is arranged to form a first ring chamber between the emergency running support body and the rim and to form a second ring chamber between the emergency running support surface and the pneumatic tire. At least one container, which contains a lubricant, is positioned inside the first ring chamber, and the at least one container includes at least one device for distributing the lubricant in the event of the emergency condition. The at least one device for distributing the lubricant is coupled to the second ring chamber.

According to a feature of the present invention, the at least one container can be positioned on an interior of the emergency running support body, and the emergency running support body can include at least one recess and the at least one container may include at least one extension. The at least one extension can be arranged with the at least one recess such that an end of the at least one extension at least partially extends into the second ring chamber, and the at least one device for distributing the lubricant may be located on the end of the at least one extension. The end of the at least one extension can be essentially in a plane of the emergency running surface.

In accordance with the instant invention, the at least one extension may be provided essentially in the end section of the emergency running support body in a level of the emergency running surface with predetermined breakage points. The predetermined breakage points may include areas with one of thinner exterior walls and grooves.

In accordance with another feature of the invention, the at least one device for distributing the lubricant can include removable covers positioned at ends of extensions of the at least one container. The ends of the extensions can be positioned essentially at a level of the emergency running surface. The removable covers may be removed by being torn off the ends of the extensions. Further, the removable covers may include one of lids and caps.

The at least one device for distributing the lubricant may include an extension coupled to the at least one container. The extension can include an end section positioned essentially in a level of the emergency running surface composed of a material sensitive to at least one of thermal and mechanical stress. The end section can be composed of thermoplastic plastic.

According to another feature of the invention, the at least one device for distributing the lubricant can be activatable by pressure valves.

In accordance with still another feature of the present invention, a shape of the at least one container can be structured to correspond to an interior profile of the emergency running support body.

Moreover, at least one container can be provided over a circumference of the emergency running support body. When the at least one contain is filled with lubricant and the vehicle tire is rotated, asymmetries in the rotational masses of the vehicle tire can be leveled.

Further, the emergency running support body can include a slitted ring having ends connected together with a connecting mechanism, and the at least one container can include a plurality of containers, which are symmetrically arranged to compensate for rotational imbalance due to the connecting mechanism.

According to still another feature of the instant invention, the emergency running support body may include a profiled body having two end sections that are curved such that apexes of curves are positioned radially outwardly, and the at least one device for distributing the lubricant may be positioned radially inside of the apexes of the curves.

In accordance with a further feature of the present invention, the emergency running support body may include a profiled body having a middle section that is curved such that an apex of curve is positioned radially inwardly, and the at least one device for distributing the lubricant may be positioned to extend at least partially into the middle section.

According to a still further feature of the invention, the emergency running support body can include a flat surface.

The invention is directed to a process for forming a tire having a pneumatic tire that includes a tread, two side walls, a carcass, reinforcing elements, and two tire beads with bead cores, that is mounted on a rim, at least one container, which contains a lubricant, that includes at least one device for distributing the lubricant, and an emergency running support body supported on the rim which is arranged to support one of the pneumatic tire and an interior of the tread in an event of an emergency condition. The emergency running support body includes a shell-shaped ring body located inside the pneumatic tire and an emergency running surface on its exterior, and the emergency running support body is arranged to form a first ring chamber between the emergency running support body and the rim and to form a second ring chamber between the emergency running support surface and the pneumatic tire. The process includes positioning the at least one container inside the first ring chamber, and positioning the at least one device for distributing the lubricant to at least partially extends into the second ring chamber.

According to a feature of the instant invention, the emergency running support body may include at least one recess and the at least one container may include at least one extension that includes an end on which the device for distributing the lubricant is located, and the process can further include inserting the at least one extension through the at least one recess such that the end of the at least one extension at least partially extends into the second ring chamber. The end of the at least one extension can be essentially in a plane of the emergency running surface.

In accordance with another feature of the invention, the at least one device for distributing the lubricant can include a removable cover positioned at an end of an extension of the at least one container, and the process may further include positioning the end of the extension essentially at a level of the emergency running surface.

A shape of the at least one container can be structured to correspond to an interior profile of the emergency running support body.

Further, the emergency running support body may include a slitted ring and the at least one container comprises a plurality of containers, and the process can further include connecting the ends of the slitted ring together with a connecting mechanism, and symmetrically arranging the plurality of containers to compensate for rotational imbalance due to the connecting mechanism.

According to the instant invention, the emergency running support body can include a profiled body having two end sections that are curved such that apexes of curves are positioned radially outwardly, and the at least one device for distributing the lubricant may be positioned radially inside of the apexes of the curves.

Moreover, the emergency running support body can include a profiled body having a middle section that is curved such that an apex of curve is positioned radially inwardly, and the at least one device for distributing the lubricant can be positioned to extend at least partially into the middle section.

Still further, the emergency running support body can include a flat surface.

The instant invention is directed to a process for lubricating a tire in an event of an emergency, the tire having a pneumatic tire that includes a tread, two side walls, a carcass, reinforcing elements, and two tire beads with bead cores, that is mounted on a rim, at least one container, which contains a lubricant, that includes at least one device for distributing the lubricant, and an emergency running support body supported on the rim which is arranged to support one of the pneumatic tire and an interior of the tread in an event of an emergency condition. The emergency running support body includes a shell-shaped ring body located inside the pneumatic tire and an emergency running surface on its exterior, and the emergency running support body is arranged to form a first ring chamber between the emergency running support body and the rim and to form a second ring chamber between the emergency running support surface and the pneumatic tire. The process includes engaging an end of the device for distributing the lubricant with one of the interior of the tread and the tire in the second ring chamber, whereby the engaging removes the end of the device for distributing the lubricant. The at least one container in the first ring chamber is separated from the one of the interior of the tread and the tire by the emergency running support body.

In accordance with yet another feature of the instant invention, the device for distributing the lubricant can be composed of a material sensitive to at least one of thermal and mechanical stress. Further, the end section may be composed of thermoplastic plastic.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
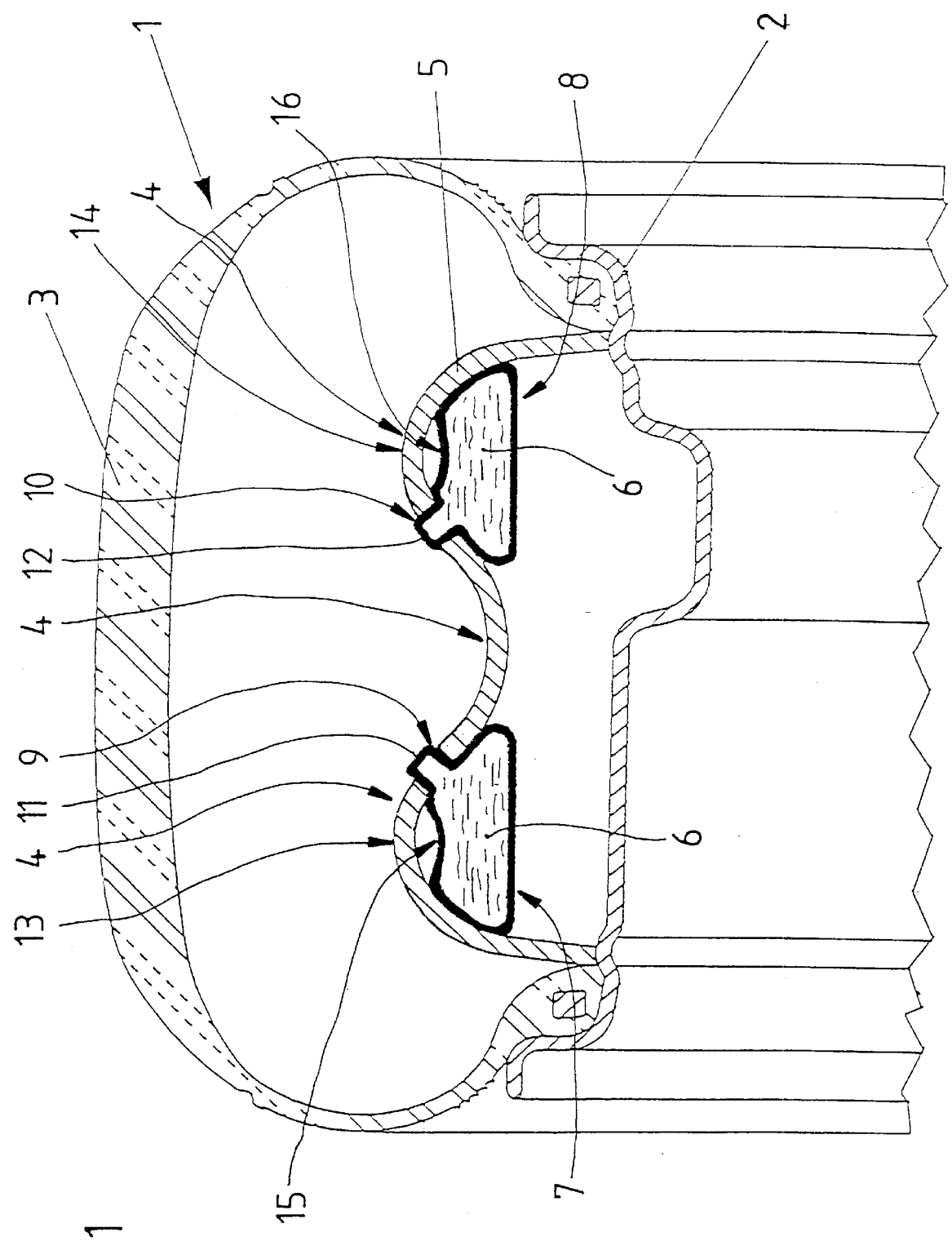
FIG. 1 illustrates a vehicle wheel including a standard rim and a standard tire, having an emergency running support body and containers filled with lubricant.

FIG. 1 shows a section of a standard pneumatic tire 1, which has been pulled onto a standard rim 2 and includes a tread region 3 which, in the case of a loss of air, i.e., under emergency running conditions, supports itself on an emergency running surface 4 of an emergency running support body 5, which is formed as a shell-shaped ring body.

Containers 7 and 8, which are filled with lubricant 6, are arranged on an inner side of the emergency running support body 5. Containers 7 and 8 have round extensions 9 and 10, respectively, that extend through corresponding bores in emergency running support body 5 and include portions which extend into a ring chamber formed between emergency running support body 5 and pneumatic tire 1. These portions, e.g., ends 11 and 12 of extensions 9 and 10, are arranged to slightly protrude from emergency running support surface 4 (or to slightly extend into the ring chamber), so that ends 11 and 12 are located essentially in an arched plane of emergency running surface 4 of emergency running support body 5. Ends 11 and 12 include devices for distributing the lubricant and/or are constructed in this region such that they can be opened by relative movement and/or friction between tread region 3 and emergency running surface 4. For this purpose, ends 11 and 12 of extensions 9 and 10, respectively, include, e.g., a thermoplastic plastic that is sensitive to thermal and/or mechanical strain, which is destroyed by the above-mentioned relative movement and/or friction.

Extensions 9 and 10 and/or their respective ends 11 and 12 are arranged within arched emergency running surface 4 of emergency running support body 5, and each includes at least a portion which protrudes into a region of a central recess of emergency running support body 5 that is located underneath, i.e., radially inside of, apexes 13 and 14 of the arches. Apexes 13 and 14 of the arches are arranged to face radially outwardly and to be adjacent tread region 3. By such a construction and arrangement, ends 11 and 12 of extensions 9 and 10 are protected from coincidental flattenings of tire 1, e.g., when driving over the edge of a curb, and, therefore, only come into contact with tread region 3 of tire 1 when emergency running conditions are truly present, i.e., in the event of a loss of pressure in the tire is so high that tread region 3 rests on emergency running surface 4 and clings against it.

Containers 7 and 8, which are filled with a lubricant, are regionally adapted to an inner contour of emergency running support body 5, and are adhered thereto in these contact regions. Adhesion can be completely sufficient because all centrifugal forces that occur are additionally absorbed by the form fit with emergency running support body 5 and the inertial forces acting in the circumferential direction are absorbed by the form fit of the extensions in the recesses.

In their region facing inwardly and/or outwardly, lubricant containers 7 and 8 include concave indentations 15 and 16 which, serve to introduce the centrifugal force occurring throughout the mass of lubricant into the walls of lubricant containers 7 and 8 in such a way that, as inertial force increases, an increasing pressing against the inner surface of emergency running support body 5 occurs, and, when extensions 9 and 10 have been opened under an emergency running conditions, serve to guide the lubricant out of containers 7 and 8 if centrifugal force is acting on them.

Figure 2:
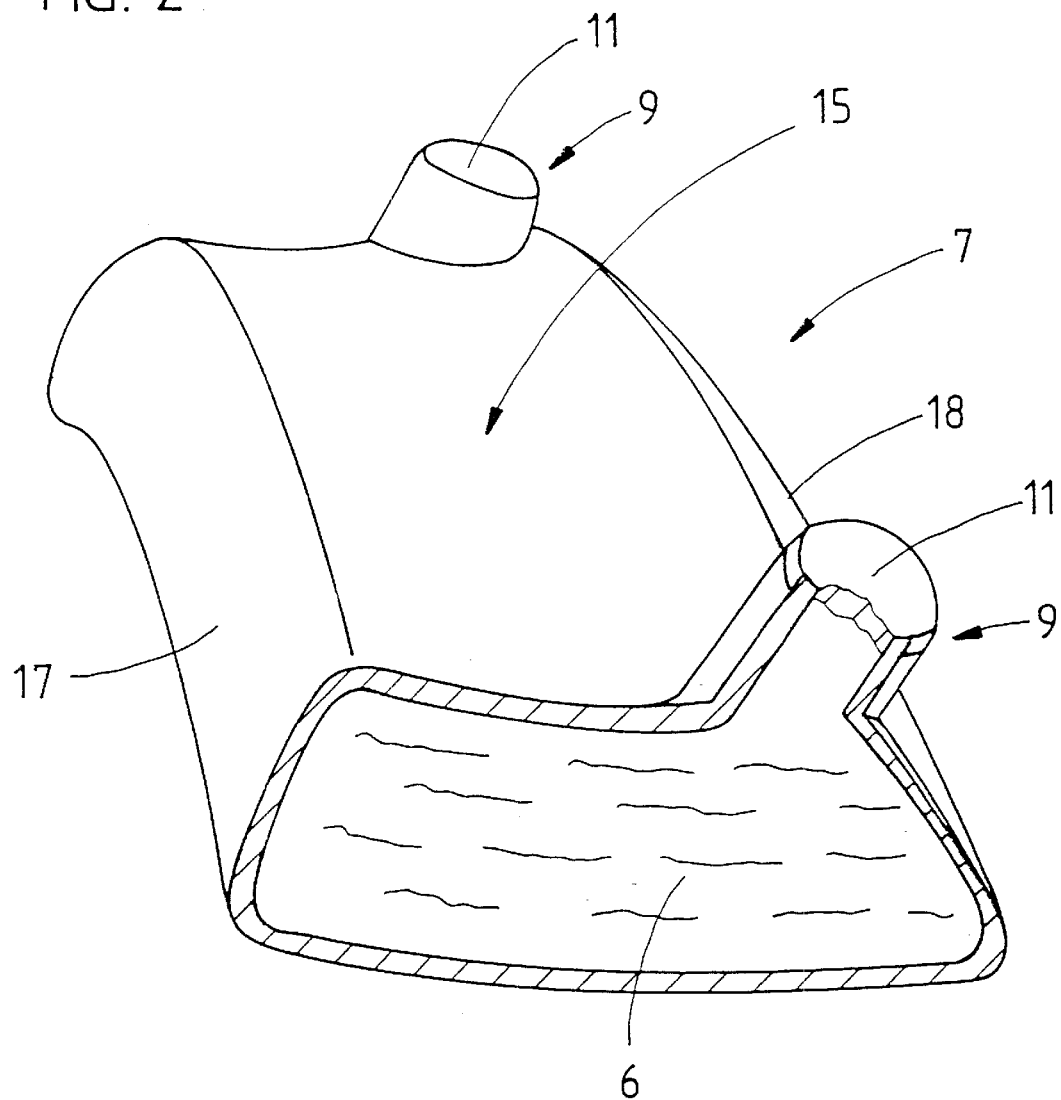
FIG. 2 illustrates a section of a container filled with lubricant according to FIG. 1.

FIG. 2 shows a perspective view, which is sectioned on its front side, of an exemplary embodiment of a container 7 filled with a lubricant 6 in accordance with those containers depicted in FIG. 1.

As is clearly visible here, container 7, which is filled with lubricant 6, is structured to adapt to the circumferential bend of the inner surface of emergency running support body 5, and, in its integrated state, rests against the inner surface of emergency running support body 5 with its lateral surfaces 17 and 18 and is adhered to the inner surface there.

The centrifugal force acting on the lubricant mass acts by way of concave indentation 15 of container 7 in the sense of a reinforcement of the pressure on the inner surface of emergency running support body 5.

Extensions 9 are arranged as being displaced rather more or less toward the center of 7 container. Further, in their integrated state, extensions 9 are arranged within emergency running support body 5 and ends 11 are arranged to protrude or extend through emergency running support body 5 into the ring chamber. In this regard, ends 11 are arranged to slightly extend into the ring chamber such that the ends are located essentially in the plane of emergency running surface 4.

Figure 3:
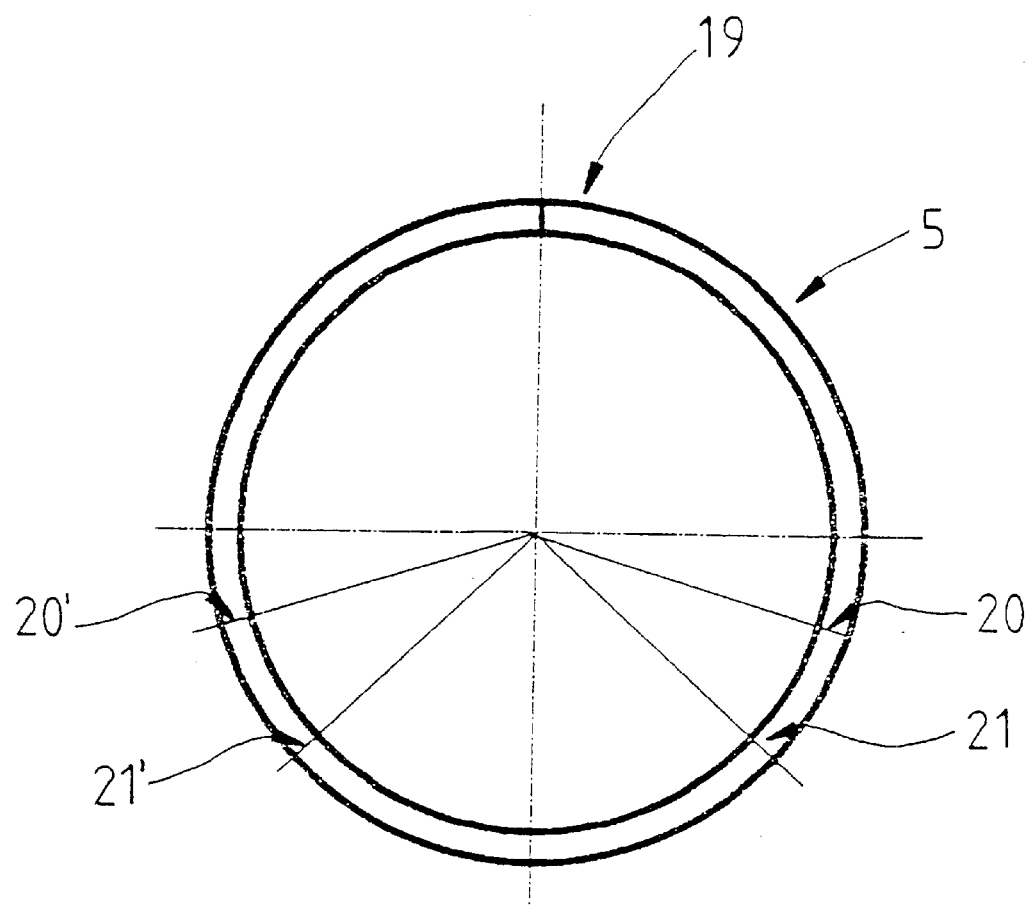
FIG. 3 illustrates a principle depiction of the arrangement of containers around the circumference of an emergency running support body.

FIG. 3 shows a principle depiction of the arrangement of containers filled with lubricant around a circumference of emergency running support body 5, which arrangement serves to achieve a balance of mass.

Emergency running support body 5 is formed as a slitted ring, whose ends are connected to one another with a locking or connection mechanism 19 (not shown in detail).

To compensate for uneven distribution of mass around the circumference of emergency running support body 5 caused by locking mechanism 19, two containers filled with lubricant may be arranged symmetrically with respect to their axial position, and can be attached at circumferential positions or circumferential points 20 and 20' and/or 21 and 21'.

As long as the containers are filled, compensation for the unevenness of mass due to locking mechanism 19 results, which allows the wheel to rotate without any imbalance.

Only when the containers filled with lubricant are emptied does an unevenness of mass result. However, this imbalance can be useful, e.g., to notify the driver of the arising emergency running conditions arising by increasing vibrations, or can be evaluated by appropriate measuring methods and adapted into a notification for the driver.

Figure 4:
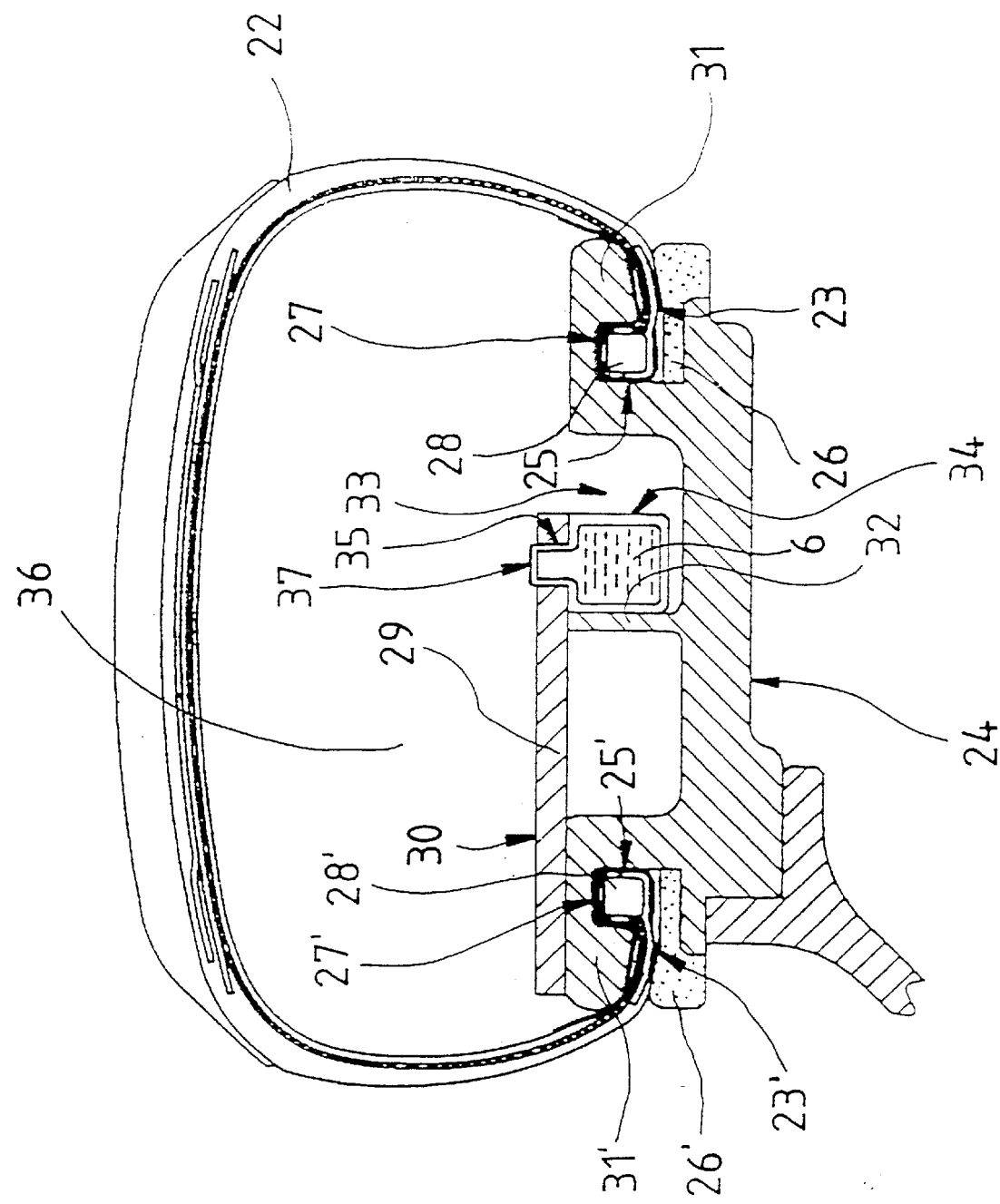
FIG. 4 illustrates another embodiment of a vehicle wheel with an emergency running support body and with containers filled with lubricant.

FIG. 4 shows a further embodiment of a vehicle wheel with an emergency running support body and containers filled with lubricant 6. Pneumatic tire 22 being clamped in its bead regions 23 and 23' inside ring chambers 25 and 25' provided in rim 24 with the aid of filler rings 26 and 26' and, thus, is connected to rim 24. For this purpose, beads 27 and 27' have an elastically extensible and elastically compressible core 28 and 28'.

An emergency running support body 29, formed as a shell-shaped ring body, is arranged inside tire 22 and has an emergency running surface 30 on its radially outer side that can be structured in any desired manner, e.g., with profile enhancers or ribs. Under emergency running conditions, the inner side of pneumatic tire 22 is supported on emergency running support surface 30. Emergency running support body 29 is again supported on rim 24 and/or attached thereto, e.g., on an outer side of rim flange 31' on one side and on a support rib 32 that is essentially arranged toward the center on the other side.

Containers 34 filled with lubricant 6 are arranged inside ring chamber 33 formed between emergency running support body 29 and rim 24 and are attached to an inner side of emergency running support body 29.

Containers 34 have a round extension 35 that extends through corresponding bores of emergency running support body 29 into a ring chamber 36 formed between emergency running support body 29 and pneumatic tire 22. Ends 37 of extensions 35 are arranged to protrude slightly from emergency running support body 29 (or to slightly extend into ring chamber 36) so that end 37 lies essentially in the plane of emergency running surface 30 of the emergency running support body 29. End 37 includes devices for distributing the lubricant and/or are formed in this region such that it can be opened by relative movement and/or friction between inner side of tire 22 and emergency running surface 30. For this purpose, ends 37 of extensions 35 include, e.g., thermoplastic plastic, which is sensitive to thermal and/or mechanical strain and is destroyed by the above-mentioned relative movement and/or friction. Lubricant 6 can then escape from containers 34 under the influence of centrifugal force.

Emergency running support body 29, as well as emergency running support body 5, can be constructed of various materials, e.g., light metal, plastic, or flexible laminates, i.e., perhaps of light metal rings that have elastomer material on their support regions on the rim.

Emergency running support body 29 can also be formed in a double-sided fashion, where support rib 32 can be omitted and each emergency running support body is supported on a respective rim flange 31 or 31' to protrude toward the center, thereby forming the ring chamber 36 between emergency running support body 29 and rim 24. Further, containers 34 containing lubricant 6 can be arranged on the inner side of emergency running support bodies 29 and inside ring chamber 33 formed between emergency running support bodies 29 and rim 24.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

| List of Reference Characters | |
|---|---|
| 1 | Pneumatic tire |
| 2 | Rim |
| 3 | Tread region |
| 4 | Emergency running surface |

-continued

List of Reference Characters

| | |
|---|---|
| 5 | Emergency running support body |
| 6 | Lubricant |
| 7, 8 | Containers filled with lubricant |
| 9, 10 | Extension |
| 11, 12 | Extension ends |
| 13, 14 | Apex |
| 15, 16 | Concave indentations |
| 17, 18 | Side surface of the container |
| 19 | Lock/Connection mechanism for the emergency running support body |
| 20,20' | Circumferential point on the emergency running support body |
| 21,21' | Circumferential point on the emergency running support body |
| 22 | Pneumatic tire |
| 23,23' | Bead region |
| 24 | Rim |
| 25,25' | Ring chamber |
| 26,26' | Filler ring |
| 27,27' | Bead |
| 28,28' | Elastic core |
| 29 | Emergency running support body |
| 30 | Emergency running surface |
| 31,31' | Rim flange |
| 32 | Support rib |
| 33 | Ring chamber |
| 34 | Container filled with lubricant |
| 35 | Extension |
| 36 | Ring chamber |
| 37 | Extension ends |

What is claimed is:

1. A vehicle wheel comprising:

a rim;

a pneumatic tire comprising a tread, two side walls, a carcass, reinforcing elements, and two tire beads with bead cores, said pneumatic tire being mounted on said rim;

an emergency running support body supported on said rim which is arranged to support one of said pneumatic tire and an interior of said tread in an event of an emergency condition;

said emergency running support body comprising a shell-shaped ring body located inside said pneumatic tire and an emergency running support surface on its exterior, wherein said emergency running support body is arranged to form a first ring chamber between said emergency running support body and said rim and to form a second ring chamber between said emergency running support surface and said pneumatic tire;

at least one container, which contains a lubricant, being positioned inside said first ring chamber;

said at least one container including at least one device for distributing said lubricant in the event of said emergency condition, said at least one device for distributing said lubricant being coupled to said second ring chamber, wherein said emergency running support body comprises a profiled body having two end sections that are curved such that apexes of curves are positioned radially outwardly, and wherein said at least one device for distributing said lubricant is positioned radially inside of said apexes of said curves.

2. A vehicle wheel comprising:

a rim;

a pneumatic tire comprising a tread, two side walls, a carcass, reinforcing elements, and two tire beads with bead cores, said pneumatic tire being mounted on said rim;

an emergency running support body supported on said rim which is arranged to support one of said pneumatic tire and an interior of said tread in an event of an emergency condition;

said emergency running support body comprising a shell-shaped ring body located inside said pneumatic tire and an emergency running support surface on its exterior, wherein said emergency running support body is arranged to form a first ring chamber between said emergency running support body and said rim and to form a second ring chamber between said emergency running support surface and said pneumatic tire;

at least one container, which contains a lubricant, being positioned inside said first ring chamber;

said at least one container including at least one device for distributing said lubricant in the event of said emergency condition, said at least one device for distributing said lubricant being coupled to said second ring chamber, wherein said emergency running support body comprises a profiled body having a middle section that is curved such that an apex of curve is positioned radially inwardly, and wherein said at least one device for distributing said lubricant is positioned to extend at least partially into said middle section.

3. A vehicle wheel comprising:

a rim;

a pneumatic tire comprising a tread, two side walls, a carcass, reinforcing elements, and two tire beads with bead cores, said pneumatic tire being mounted on said rim;

an emergency running support body supported on said rim which is arranged to support one of said pneumatic tire and an interior of said tread in an event of an emergency condition;

said emergency running support body comprising a shell-shaped ring body located inside said pneumatic tire and an emergency running support surface on its exterior;

said emergency running support body including a central recess and two arched portions;

said emergency running support body being arranged to form a first ring chamber between said emergency running support body and said rim and to form a second ring chamber between said emergency running support surface and said pneumatic tire;

at least one container, which contains a lubricant, being positioned inside said first ring chamber;

said at least one container including at least two extensions for distributing said lubricant in the event of said emergency condition;

each of said at least two extensions for distributing said lubricant being configured to distribute lubricant to said second ring chamber in an area of the central recess and between of the two arched portions.

4. A process for forming a tire having a pneumatic tire that includes a tread, two side walls, a carcass, reinforcing elements, and two tire beads with bead cores, mounted on a rim, at least one container, which contains a lubricant, includes at least one device for distributing the lubricant, and an emergency running support body supported on the rim which is arranged to support one of the pneumatic tire and an interior of the tread in an event of an emergency condition, wherein the emergency running support body includes a shell-shaped ring body located inside the pneumatic tire and an emergency running support surface on its exterior, the emergency running support body is arranged to form a first ring chamber between the emergency running support body and the rim and to form a second ring chamber between the emergency running support surface and the pneumatic tire, the process comprising:

positioning the at least one container inside the first ring chamber; and positioning the at least one device for distributing the lubricant to at least partially extend into the second ring chamber, wherein the emergency running support body comprises a profiled body having two end sections that are curved such that apexes of curves are positioned radially outwardly, and wherein the at least one device for distributing the lubricant is positioned radially inside of the apexes of the curves.

5. A process for forming a tire having a pneumatic tire that includes a tread, two side walls, a carcass, reinforcing elements, and two tire beads with bead cores, mounted on a rim, at least one container, which contains a lubricant, includes at least one device for distributing the lubricant, and an emergency running support body supported on the rim which is arranged to support one of the pneumatic tire and an interior of the tread in an event of an emergency condition, wherein the emergency running support body includes a shell-shaped ring body located inside the pneumatic tire and an emergency running support surface on its exterior, the emergency running support body is arranged to form a first ring chamber between the emergency running support body and the rim and to form a second ring chamber between the emergency running support surface and the pneumatic tire, the process comprising:

positioning the at least one container inside the first ring chamber; and positioning the at least one device for distributing the lubricant to at least partially extend into the second ring chamber, wherein the emergency running support body comprises a profiled body having a middle section that is curved such that an apex of curve is positioned radially inwardly, and wherein the at least one device for distributing the lubricant is positioned to extend at least partially into the middle section.

* * * * *